Sept. 1, 1942. H. DAZZO 2,294,835
PIPE FITTING FOR AWNING ARMS AND THE LIKE
Filed July 23, 1941

INVENTOR
Henry Dazzo
BY
ATTORNEY

Patented Sept. 1, 1942

2,294,835

UNITED STATES PATENT OFFICE 2,294,835

PIPE FITTING FOR AWNING ARMS AND THE LIKE

Henry Dazzo, Brooklyn, N. Y.

Application July 23, 1941, Serial No. 403,601

5 Claims. (Cl. 287—54)

This invention relates to new and useful improvements in a fitting for awning arms and the like.

More specifically, the invention proposes the construction of fittings for an awning for attaching an awning bar positioned at the front edge of the awning cloth upon the side arms of the awning structure. It is proposed that each fitting be characterized by means for attaching its back portion to the awning arm, and an adjustable clamp at the front end thereof for tightly gripping the awning bar attached to the front edge of the awning material.

Still further it is proposed to characterize the clamp by a semi-cylindrical portion integrally formed with the base member and upon a portion of which a clamp member having a complementary semi-cylindrical portion is disposed at a position above the first mentioned semi-cylindrical portion in a manner to encircle and grip the said bar.

A further object of the invention proposes the provision of a headed fastening element engaged through the clamp member and engaging the base member for drawing the semi-circular portions together.

It is further proposed to provide the clamp member with a fulcrum element for resting upon a portion of the base member and about which the clamp member is adapted to be pivoted by the tightening action of the headed fastening element for causing the semi-circular portions to tightly grip the bar.

It is furthermore proposed to provide the clamp member with a pivotally mounted block set into an opening formed in the clamp member and through which the headed fastening element is adapted to extend in a manner to provide a complementary flat surface against which the head of the fastening element may engage regardless of the angular inclination of the clamp member relative to the head.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1:
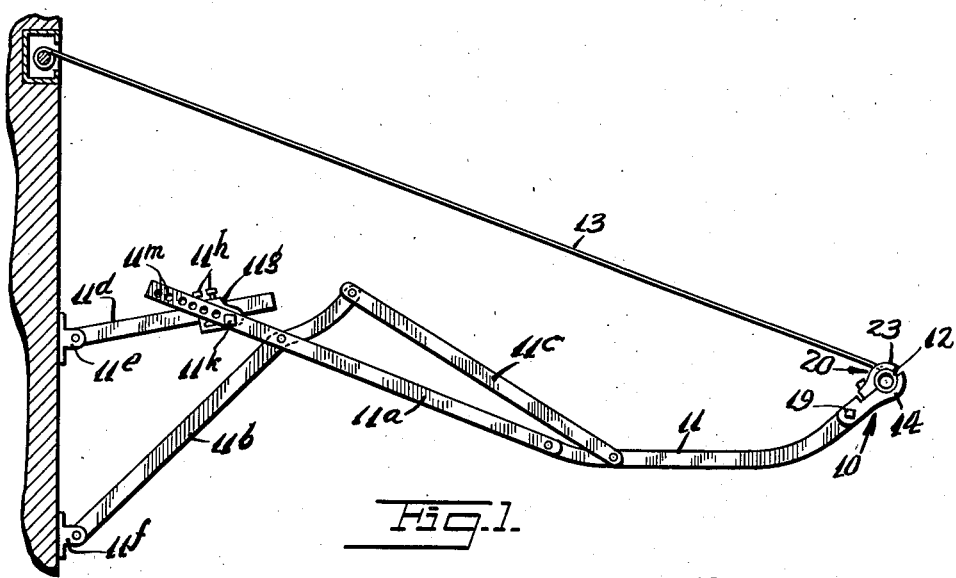
Fig. 1 is a side elevational view of an awning having a fitting constructed in accordance with this invention.
Figure 2:
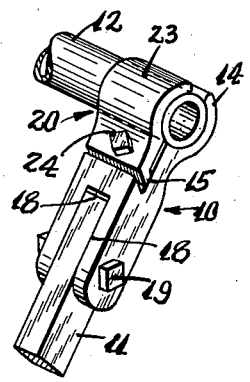
Fig. 2 is a perspective view of a portion of Fig. 1.

The fitting for awning arms, according to this invention, is characterized by a base member 10 for engagement upon the side 11 of an awning structure. The fitting is designed for connecting the ends of the bar 12 to the outer end of the side arms 11. The bar 12 has the free outer end of the awning material 13 attached thereto.

The awning structure may consist of pivotally connected members 11$^a$, 11$^b$, and 11$^c$ forming a lazy tong awning arm. The arm 11$^a$ is adjustably connected to a pivoted arm 11$^d$ which is secured to the wall by a suitable bracket 11$^e$. The member 11$^b$ is also secured to the wall by another suitable bracket 11$^f$. A slide member 11$^g$ may be secured at various positions on the pivoted arm 11$^d$ by set screws 11$^h$. This slide member 11$^g$ is provided with a removable pintle 11$^k$ adapted to engage one of the apertures 11$^m$ formed at the free end of the member 11$^a$ so that the slant of the awning and its height from the street may be controlled.

The base member 10 is characterized by a hollow semi-cylindrical front portion 14 which continues into a flat central portion 15 having its flat top surface extending radially of the axis of the semi-cylindrical portion. The base member 10 is formed of metal and the flat top central portion 15 continues into a relatively large back portion 16 having a shoulder 17 at the rear of the flat top surface 15.

A means is provided for attaching the back portion 16 to the outer end of the awning arm 11. In this first form of the invention this attaching means is characterized by a fork 18 formed at the rear end of the back portion 16 and which has its fingers engaging the side faces of the end of the side arm 11. A bolt 19 is engaged through complementary openings formed in the overlapping portions of the side arm 11 and the fork 18 for securing these portions together as a unit.

A clamp member 20 has a rear portion 21 disposed upon the flat top central portion 15 of the base member 10. The rear portion 21 is provided with a fulcrum element 22 at its rear end which rests upon the face of the flat top central portion 15. This fulcrum element is in the form of a downwardly extended projection formed upon the back end of the rear portion 21. The clamp member 20 is formed of the same material as the base member 10. The front of the clamp member 20 continues into a front hollow semi-cylindrical portion 23 complementary to the semi-cylindrical portion 14 of the base member 10 for forming a socket to receive the end of the awning bar 12.

A headed fastening element in the form of a bolt 24 is passed freely through an opening 25 formed in the rear portion 21 of the clamp member 20. The end of the bolt 24 threadedly engages a complementary opening 26 extended downwards from the face of the flat top central portion 15 of the base member 10. The bolt 24 is located slightly to the front of the fulcrum element 22 and as the bolt is tightened it causes the clamp member to pivot about the fulcrum element 22 causing the front end of the cylindrical portion 23 to move towards the cylindrical portion 14 to tightly grip and clamp the end of the awning bar 12.

Figure 4:
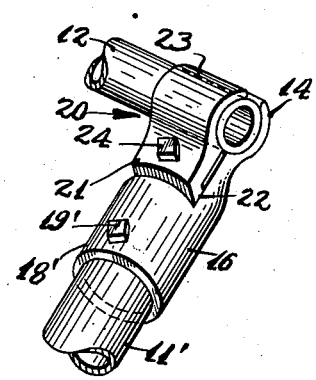
Fig. 4 is a view similar to Fig. 2 but illustrating a modification of the invention.
Figure 5:
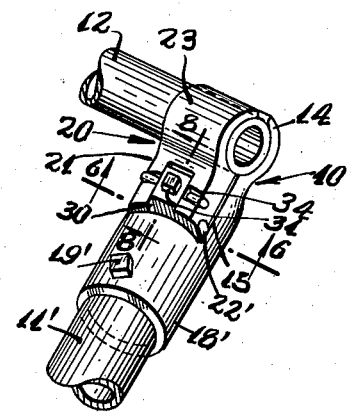
Fig. 5 is a view similar to Fig. 4 but illustrating a still further modification of the invention.
Figure 3:
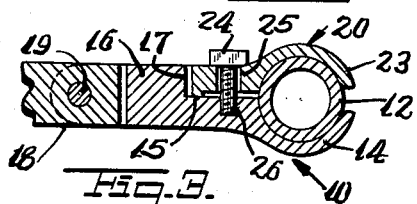
Fig. 3 is a longitudinal vertical sectional view of Fig. 2.
Figures 6, 7:
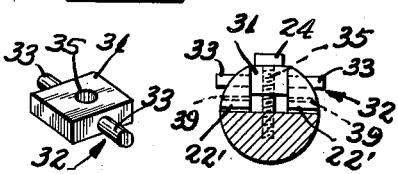
Fig. 6 is a lateral vertical sectional view taken on the line 6—6 of Fig. 5.
Fig. 7 is a perspective view of the block per se.
Figure 8:
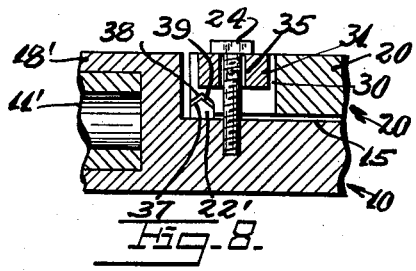
Fig. 8 is a longitudinal vertical sectional view taken on the line 8—8 of Fig. 5.

According to the modification of the invention shown in Fig. 4 the construction of the fitting for an awning arm is similar to that previously described except for a slightly different means for attaching the back portion 16 of the base member 10 to the side arm 11' of the awning structure. The side arm 11 in this form of the invention is of tubular construction and the back portion 16 is formed with a tubular socket 18' into which the free end of the side arm 11 is engaged. A bolt 19' is threadedly engaged through one wall of the tubular socket 18' and bears against the tubular side arm 11' for connecting these parts together as a unit.

According to the modification of the invention shown in Figs. 5 to 8 the construction of the fitting for an awning arm is similar to that described relative to Fig. 4, except for the provision of means for providing a flat surface against which the head of the bolt 24 is adapted to be fixedly held. In this form of the invention the rear portion 21 of the clamp member 20 is provided with a cutout 30 in which a block 31 is disposed. This block 31 is provided with a trunnion 32 in the form of outwardly extending trunnion elements 33 extended from opposite sides of the block 31. The trunnion elements 33 engage within complementary semi-circular recesses 34 formed in the top face of the clamp member 20 on opposite sides of the opening 30. The block 31 is provided with a central aperture 35 through which the threaded portion of the bolt 24 extends to be engaged into the threaded opening 26 of the base member 10. With this construction the block 31 is capable of pivoting relative to the clamp member 23 to provide a flat surface against which the bottom flat face of the head of the bolt 24 is adapted to securely seat regardless of the angular inclination of the clamp 23 with relation to the base member 10.

This form of the invention is also provided with a means for increasing the operative size of the fulcrum element 22' for accommodating awning bars 12 of slightly different thicknesses. In this form of the invention the fulcrum element 22' is in the form of a separate block having an inverted V-shaped top surface 37 which is adapted to engage a complementary inverted V-shaped recess 38 formed in the bottom face of the rear portion 21 of the clamp member 20. Shims 39 are adapted to be engaged between the adjacent faces of the V-shaped surface 37 and the V-shaped recess 38 for increasing the length of the fulcrum 22'.

It is to be understood that this fitting may be used for other purposes besides its use as an awning arm connection.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A fitting for an awning arm, comprising a base member having a hollow semi-cylindrical front portion continuing into a flat top portion, a clamp member having a rear portion disposed upon said flat top portion and a front hollow semi-cylindrical portion complementary to said semi-cylindrical portion to form a socket for an awning bar, a fulcrum formed on the top face of the flat top portion and engaging into a complementary recess formed in the bottom face of the rear portion of said clamp member, a block set freely into a cutout extended inwards from the back end of the rear portion of said clamp member, means pivotally supporting said block, and a bolt passing freely through an enlarged opening formed in said block and threadedly engaging a complementary opening formed in said flat top portion, whereby regardless of the angular inclination of said clamp member said block will pivot relative thereto and provide a flat surface against which the bottom face of the head of the bolt will solidly seat and securely hold the block in position on said clamp member and said clamp member in position on said flat top portion.

2. A fitting for an awning arm, comprising a base member having a hollow semi-cylindrical front portion continuing into a flat top portion, a clamp member having a rear portion disposed upon said flat top portion and a front hollow semi-cylindrical portion complementary to said semi-cylindrical portion to form a socket for an awning bar, a fulcrum formed on the top face of the flat top portion and engaging into a complementary recess formed in the bottom face of the rear portion of said clamp member, a block set freely into a cutout extended inwards from the back end of the rear portion of said clamp member, means pivotally supporting said block, and a bolt passing freely through an enlarged opening formed in said block and threadedly engaging a complementary opening formed in said flat top portion, whereby regardless of the angular inclination of said clamp member said block will pivot relative thereto and provide a flat surface against which the bottom face of the head of the bolt will solidly seat and securely hold the block in position on said clamp member and said clamp member in position on said flat top portion, said means, comprising trunnion elements extending from the sides of said block and engaging complementary recesses formed in the rear portion of said clamp member on opposite sides of said cutout.

3. A fitting for an awning arm, comprising a base member having a hollow semi-cylindrical front portion continuing into a flat top portion, a clamp member having a rear portion disposed upon said flat top portion and a front hollow semi-cylindrical portion complementary to said semi-cylindrical portion to form a socket for an awning bar, a fulcrum formed on the top face of the flat top portion and engaging into a complementary recess formed in the bottom face of the rear portion of said clamp member, a block set freely into a cutout extended inwards from the back end of the rear portion of said clamp member, means pivotally supporting said block, and a bolt passing freely through an enlarged opening formed in said black and threadedly engaging a complementary opening formed in said flat top portion, whereby regardless of the angular inclination of said clamp member said block will pivot relative thereto and provide a flat surface against which the bottom face of the head of the bolt will solidly seat and securely hold the block in position on said clamp member and said clamp member in position on said flat top portion, said means, comprising trunnion elements extending from the sides of said block and engaging complementary recesses formed in the rear portion of said clamp member on opposite sides of said cutout, said bolt being extended through said block at right angles to the axis of said trunnion elements.

4. A fitting for an awning arm, comprising a base member having a hollow semi-cylindrical front portion continuing into a flat top portion, a clamp member having a rear portion disposed upon said flat top portion and a front hollow semi-cylindrical portion complementary to said semi-cylindrical portion to form a socket for an awning bar, a fulcrum formed on the top face of the flat top portion and engaging into a complementary recess formed in the bottom face of the rear portion of said clamp member, a block set freely into a cutout extended inwards from the back end of the rear portion of said clamp member, means pivotally supporting said block, and a bolt passing freely through an enlarged opening formed in said block and threadedly engaging a complementary opening formed in said flat top portion, whereby regardless of the angular inclination of said clamp member said block will pivot relative thereto and provide a flat surface against which the bottom face of the head of the bolt will solidly seat and securely hold the block in position on said clamp member and said clamp member in position on said flat top portion, and means for increasing the operative size of said fulcrum to spread said semi-cylindrical portions to accommodate awning bars of different thicknesses.

5. A fitting for an awning arm, comprising a base member having a hollow semi-cylindrical front portion continuing into a flat top portion, a clamp member having a rear portion disposed upon said flat top portion and a front hollow semi-cylindrical portion complementary to said semi-cylindrical portion to form a socket for an awning bar, a fulcrum formed on the top face of the flat top portion and engaging into a complementary recess formed in the bottom face of the rear portion of said clamp member, a block set freely into a cutout extended inwards from the back end of the rear portion of said clamp member, means pivotally supporting said block, and a bolt passing freely through an enlarged opening formed in said block and threadedly engaging a complementary opening formed in said flat top portion, whereby regardless of the angular inclination of said clamp member said block will pivot relative thereto and provide a flat surface against which the bottom face of the head of the bolt will solidly seat and securely hold the block in position on said clamp member and said clamp member in position on said flat top portion, and means for increasing the operative size of said fulcrum to spread said semi-cylindrical portions to accommodate awning bars of different thicknesses, comprising shims engageable between the adjacent faces of said fulcrum and the bottom face of the rear portion of said clamp member.

HENRY DAZZO.